Dec. 20, 1938.  J. C. SEAILLES  2,140,883
METHOD OF MANUFACTURING ALUMINA
Filed June 3, 1935
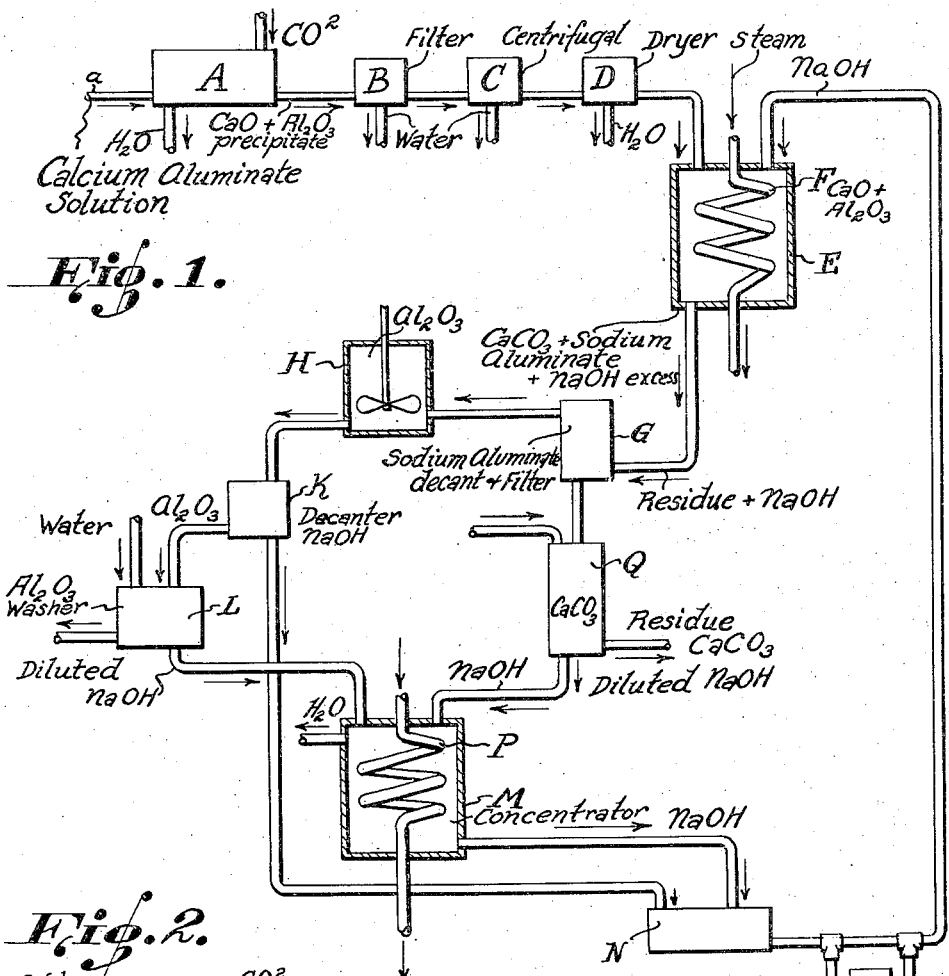
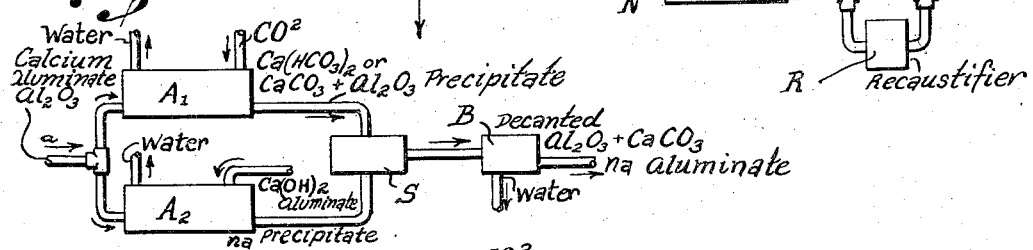
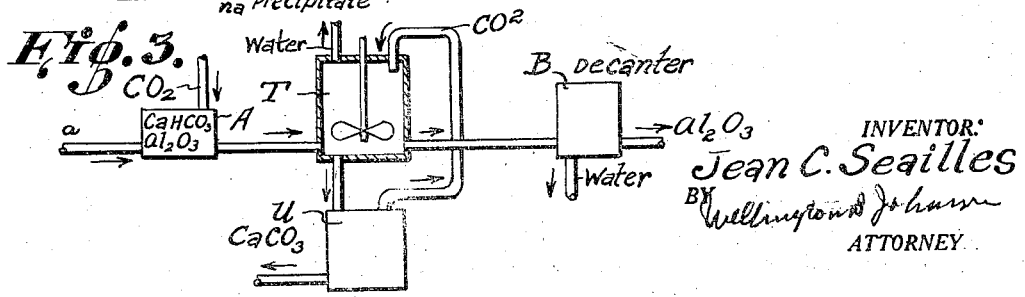
INVENTOR:
Jean C. Seailles
BY
ATTORNEY Patented Dec. 20, 1938

2,140,883

UNITED STATES PATENT OFFICE 2,140,883

METHODS OF MANUFACTURING ALUMINA

Jean Charles Séailles, Paris, France

Application June 3, 1935, Serial No. 24,768
In Luxemburg June 16, 1934

12 Claims. (Cl. 23—143)

The present invention relates to a method of manufacturing alumina from calcium aluminates. This method is particularly advantageous to apply in existing works adapted to carry out the so-called "Bayer" process, which is the most generally employed method for the industrial manufacture of alumina.

The Bayer method consists in attacking the alumina ore, which is generally bauxite, in the hot state and under high pressure, in an autoclave, by means of a concentrated lye of an alkali, such for instance as soda.

The liquor extracted from the autoclave, after this treatment, is diluted with water. A portion of the alumina it contains then deposits. The remaining liquid is again concentrated in suitable evaporators, then returned to the autoclave and so on.

The method according to the present invention consists essentially in employing as starting material, in a cycle analogous to the Bayer cycle, instead of the alumina ores generally employed, precipitates obtained from aqueous solutions of calcium aluminates.

This method has the advantage of simplifying and rendering more economical the operations included in this cycle, especially in that it considerably reduces the importance of the heating and concentrating operations, and therefore the consumption of fuel that these operations involve.

According to the present invention, starting from impure aluminates of calcium, these aluminates are dissolved in water or in saline solutions, through processes known in themselves. The solution thus obtained is freed from the impurities that have not been dissolved, among which are most of the iron and of the silica of the raw aluminates. Then alumina and lime are simultaneously precipitated by carbonic acid according to a method known in itself. The precipitate that is obtained consists of a mixture of alumina and calcium carbonate.

I may also precipitate a portion of the solution by means of carbonic acid and another portion by means of lime and then mix both precipitates, so as to obtain a mixture of alumina, calcium carbonate, calcium aluminate and eventually lime in excess.

The subsequent treatment of these precipitates is intended to separate alumina from the other bodies with which it is thus mixed.

The precipitate that is collected is preferably freed, through any suitable means, from the whole or a portion of the water it contains. It is then introduced, in suitable proportions into a vessel in which it is attacked, in the hot state, by a solution of an alkali, for instance a solution of caustic soda, or by a solution consisting of a mixture of said alkali and of alkaline aluminates.

The alumina that is present in the precipitates obtained as above explained is very soluble in alkali solutions. Owing to this property, I may, in order to dissolve alumina, make use of solutions that are at the required degree of dilution for causing alumina to deposit when they are cooled down to ordinary temperature. This permits of eliminating the diluting operations that are necessary in the usual Bayer method, these operations involving, after the separation of alumina, the necessity of reconcentrating the alkali solution so as to make it possible to again utilize it for a new attack.

With the method according to the present invention, this reconcentration, which requires a high consumption of fuel, is either eliminated or at least very considerably reduced.

Furthermore, the dissolving of alumina, in the method according to the present invention, can take place at a much lower temperature and therefore under a much lower pressure than in the Bayer method. For instance it is possible to carry out this step at atmospheric pressure and at the usual temperature usual the boiling point of the alkali solution.

By way of example, in the method according to the present invention, it is possible to carry out the dissolving of alumina by a solution of caustic soda containing 125 grammes of $Na_2O$ per litre, at a temperature of about 105°, under a pressure equal to the atmospheric pressure. On the contrary, in the Bayer method, this attack is performed with solutions containing 250 grammes of $Na_2O$ per litre, heated in an autoclave, at a pressure of 8 kgs.

Therefore, with the method according to the present invention, it is possible to avoid the use of autoclaves. Of course, it is possible, according to the invention, to effect the step in an autoclave at a pressure higher than the atmospheric pressure and, consequently, at a temperature higher than that above mentioned, with a view to accelerating the reaction. But in all cases it will be possible to reduce the time during which the matters remain in the autoclaves and the pressure, in comparison to what is necessary when carrying out the Bayer method. In order to choose the most advantageous conditions of operation, one will be guided by the rapidity with which it is desired that the dissolution should take place.

When making use as starting material of the precipitate obtained by the action of carbonic acid alone, it will be advisable to perform the usual recaustification of the alkali solutions, which, as it is well known, gradually become carbonated.

But this recaustification can be dispensed with when using a mixture in suitable proportions of precipitates obtained on the one hand by means of carbonic acid and on the other hand by means of lime. This is due to the fact that, in this case, the calcium aluminate that is present in the precipitate will be transformed into an alkaline aluminate at the expense of the alkaline carbonate that is formed.

Another important advantage of the method according to the present invention is that when making use, for subjecting it to a treatment by an alkali, of a starting material which has already been substantially freed from the ordinary impurities of the ore, and especially silica, considerable losses of alkali and alumina due to the formation of alkaline silico-aluminates are avoided.

The process according to the present invention can be applied not only when the precipitation of the initial solution of calcium aluminates is effected by means of carbonic acid, but also when use is made for the same purpose of another acid giving an insoluble salt of calcium. For instance, I may make use of oxalic acid, or phosphoric acid. It should be noted that this insoluble salt of calcium is recuperated, in the cycle of the operations above mentioned, when the caustic solution that has dissolved alumina in the hot state is separated from its insoluble residue.

In the method according to the present invention it is obviously advantageous to subject to the treatment with the caustic alkali a starting material which contains as little water as possible. As a matter of fact, this water produces a dilution of the alkali solution. Therefore, the lower the percentage of water, the more reduced will be the eventual reconcentration operations.

Therefore it will be advantageous to treat the precipitate or precipitates that constitute the starting material, before sending them to the caustic solution, in such manner as to separate the highest possible portion of the water they contain. It is possible to utilize for this purpose any known processes of decantation, centrifugation, filtration, with or without pressure. These operations can eventually be completed by drying in the hot state.

I have found that alumina precipitated from a solution of calcium aluminate has, over the alumina from the usual ores, such as bauxite, the very great advantage that it does not contain water chemically combined therein. The formula of alumina from bauxite is $Al_2O_3, 3H_2O$. On the contrary alumina obtained through the method according to the present invention seems to be an anhydrous alumina; therefore the water it retains can be separated, either wholly or nearly so, through mechanical or physical means. On the other hand, contrary to what takes place for the hydrate of alumina above mentioned, in the case of alumina obtained through precipitation of the solution of calcium aluminate, drying has not for its effect to render very difficult the subsequent attack of alumina by caustic alkali. Therefore, in this case, drying can be employed usefully for completing the mechanical dehydration of the precipitates.

Alumina thus treated dissolves subsequently without difficulty in the alkali solution.

The attack of the starting material by caustic alkali leaves an insoluble residue which consists chiefly of the calcium salts contained in said starting material. This residue must be washed so as to recover the alkali it contains, and itself is thus recovered.

The washing water is subjected to a concentration treatment. Of course, the amount of washing water is proportional to the amount of precipitate to be washed. I may, in order to reduce the amount of washing water that is necessary, reduce the amount of residue to be treated by eliminating, before sending the starting material into caustic alkali, a portion of the insoluble calcium salt it contains. For instance, in the case of a precipitation of the initial solution of calcium aluminate by means of carbonic acid, one may proceed to a recarbonatation in an aqueous medium which transforms into a soluble bicarbonate a portion of the calcium carbonate. The physical nature of the residue has also an influence upon the amount of washing water that is necessary. It should be noted that, from this point of view, calcium carbonate, due to the very nature of its crystallization, is particularly well adapted to the easy washing of the solution, while the residuary muds of the usual Bayer method call for a difficult and expensive washing.

Of course, in the method according to the present invention as in the usual Bayer method, the exhaust steam of motive machines is advantageously used for all the thermal operations that are necessary, such as: heating of the liquors that are necessary for attacking the matters, concentration of the washing and other waters, and so on. But, in the method according to the present invention, the fact that the alkali solution is only heated at a temperature averaging 100° C. constituted a further important advantage since, in order to ensure the heating of this solution, it is possible to make use of expanded steam at a relatively low pressure, while, in the Bayer method, it is necessary to heat the autoclaves with steam at high temperature and consequently at high pressure.

Preferred embodiments of the present invention, relating to the case in which the acid that is employed is carbonic acid, will be hereinafter described, with reference to the accompanying drawing, given merely by way of example, and in which:

Fig. 1 is a diagram illustrating the operations when the precipitation of the solution of calcium aluminate is obtained by means of carbonic acid alone;

Fig. 2 is a similar diagram corresponding to the case in which the precipitation is obtained through the combined action of carbonic acid and lime;

Fig. 3 is a diagram illustrating the operations in the case in which a portion of the calcium carbonate present in the starting material is eliminated before subjecting said material to the action of the alkali.

In Fig. 1, the clear solution of calcium aluminate is fed through $a$ into a vessel A in which it is treated by carbonic acid. There is formed a precipitate consisting of a mixture of calcium carbonate and alumina. This precipitate is filtered at B, separated from the excess of water at C, dried at D, and then introduced into vessel E, in which it is subjected, in the hot state, to the action of a solution of caustic soda, heated for instance by means of tubes such as F through which exhaust steam flows.

The solution thus obtained is sent to decantation and filtering apparatus G, in which the solid residue is separated from the liquid. The residue is sent to a washing device, while the liquid is sent to the decomposing apparatus H, in which it is subjected to stirring for a certain time, while it cools down. Alumina precipitates in the liquid, and the mixture thus obtained is sent to decantation and filtration apparatus K. The solution of alkali that is recovered is sent to adjustment tank N from which it is returned to vessel E for new operations.

When issuing from apparatus K, alumina, still impregnated with alkali, is sent to a washing device L from which washed alumina is collected, while the washing water, which is diluted solution of caustic soda, is sent to concentration apparatus M. The latter may be of the multiple stage type, and heated by exhaust steam flowing through tubes such as P. When issuing from the evaporators, the concentrated solution is sent to the adjustment tank N.

The residue evacuated from filter G is still charged with caustic soda. It is sent to a washing device Q, in which it is washed by a stream of fresh water. The residue, consisting chiefly of calcium carbonate, is collected. The washing liquid is sent back to the concentration apparatus M. When issuing therefrom, the re-concentrated caustic solution is sent into tank N.

Before being sent to the vessel in which the treatment takes place, the solution may be re-caustified at R, so as to eliminate the sodium carbonate which it may contain.

Fig. 2 shows a modification of the cycle of operations above described, when it is desired to start from a material containing, besides alumina and calcium carbonate, calcium aluminate.

A portion of the solution $a$ is sent to a vessel A₁, in which it is subjected to the action of carbonic acid; another portion, in suitably calculated proportion, is sent into a vessel A₂ in which it is subjected to the action of lime. The precipitates obtained in A₁ and A₂ are mixed in S and then sent to decanting apparatus B, the remainder of the operations is the same as in the preceding case, with the only difference that recaustification in R becomes unnecessary.

Fig. 3 shows the modification that must be introduced into the cycle of operations above described when it is desired to eliminate, before the alkaline treatment, a portion of the calcium carbonate, in order to reduce the importance of the washing treatment at Q.

When they issue from vessel A, the solution and the precipitate resulting from the carbonatation treatment are sent into a second vessel T, where they are subjected to another treatment by carbonic acid, while being stirred. A portion of the insoluble calcium carbonate is transformed into soluble bi-carbonate. The insoluble residue is sent into decanting apparatus B and then undergoes the cycle of operations illustrated by Fig. 1. The bicarbonated solution is sent into apparatus U in which the bicarbonate is retransformed into carbonate which is evacuated and may eventually be recovered, while the carbonic acid that is evolved is reutilized at T for another bicarbonatation.

Of course I do not wish to be limited to the specific examples above described as there might be changes made therein without departing from the principle of the present invention as comprehended within the scope of the appended claims.

What I claim is:

1. A process of manufacturing alumina which comprises, forming an aqueous solution of calcium aluminate from crude material containing such, freeing said solution from insoluble material and treating clear solution of calcium aluminate by an acid the calcium salt of which is insoluble, separating the precipitate resulting from this treatment, treating this precipitate by a hot solution of caustic alkali of a concentration in alkali averaging that which corresponds to the spontaneous decomposition of the corresponding alkaline aluminate into alkali and alumina, removing the residue that is not dissolved in said solution of alkali, cooling, while stirring, this solution thus obtained, whereby alumina precipitates, separating this precipitate and washing it with water.

2. A method of producing alumina which comprises, treating a clear aqueous solution of calcium aluminate by an acid the calcium salt of which is insoluble, separating the precipitate resulting from this treatment, treating the precipitate by a hot solution of caustic alkali of a concentration in alkali averaging that which corresponds to the spontaneous decomposition of the corresponding alkaline aluminate into alkali and alumina, removing the residue that is not dissolved in said solution of alkali, washing this residue with water, concentrating by heating the water that has served to this washing operation and which contains alkali, with a view to reutilizing it as solution of alkali in the cycle of operations, cooling, while stirring, the solution of alkali separated from said residue, whereby alumina precipitates, separating this precipitate of alumina, reutilizing in the cycle of operations the liquor of caustic alkali remaining after this separation, washing with water the alumina that has been obtained, and concentrating, by heating, the water that has served to this washing operation, so as to permit of reutilizing it as solution of alkali in the cycle of operations.

3. A method of producing alumina which comprises, treating a clear aqueous solution of calcium aluminate by an acid the calcium salt of which is insoluble, whereby a precipitate is obtained which consists chiefly of alumina and the calcium salt of said acid, treating the solution containing this precipitate with a body capable of rendering soluble a portion of said calcium salt with a view to reducing the amount of residue to be separated in the subsequent operations of the process, separating the precipitate that remains in the solution, dehydrating this precipitate, treating the precipitate thus dehydrated by a hot solution of caustic alkali of a concentration in alkali averaging that which corresponds to the spontaneous decomposition of the corresponding alkaline aluminate into alkali and alumina, removing the residue that is not dissolved in this solution of alkali, washing this residue with water, concentrating, by heating, the water that has served to this washing operation and which contains alkali, with a view to reutilizing it as solution of alkali in the cycle of operations, cooling while stirring the solution of alkali separated from said residue, whereby alumina precipitates, separating this precipitate of alumina, reutilizing in the cycle of operations the liquor of caustic alkali remaining after this separation, washing with water the alumina that has been obtained, and concentrating, by heating, the water that has served to this washing operation, so as to permit of reutilizing it as solution of alkali in the cycle of operations.

4. A method of producing alumina which comprises, treating a clear aqueous solution of calcium aluminate with carbonic acid, whereby a precipitate is obtained which consists chiefly of alumina and calcium carbonate, treating the solution containing this precipitate with a new amount of carbonic acid so as to transform a portion of the insoluble calcium carbonate into calcium bicarbonate, separating the remaining precipitate, treating the solution of calcium bicarbonate for transforming said bicarbonate into calcium carbonate and recuperating the carbonic acid, which can be reutilized, dehydrating the precipitate above mentioned, treating this dehydrated precipitate by a hot solution of caustic alkali of a concentration in alkali averaging that which corresponds to the spontaneous decomposition of the corresponding alkaline aluminate into alkali and alumina, removing the residue that is not dissolved in this solution of alkali, washing this residue with water, concentrating, by heating, the water that has served to this washing operation and which contains alkali, with a view to reutilizing it as solution of alkali in the cycle of operations, cooling, while stirring, the solution of alkali separated from said residue, whereby alumina precipitates, separating this precipitate of alumina, reutilizing in the cycle of operations the liquor of caustic alkali remaining after this separation, washing with water the alumina that has been obtained, and concentrating, by heating, the water that has served to this washing operation, so as to permit of reutilizing it as solution of alkali in the cycle of operations.

5. The process of manufacturing alumina which comprises treating an aqueous solution of calcium aluminate by an acid whose calcium salt is insoluble in water, in amount sufficient to precipitate the alumina, and the calcium from the said salt as calcium carbonate, separating this precipitate from the mother-liquor, treating it with hot solution of caustic alkali of sufficient concentration to dissolve the alumina at that temperature and to deposit the large part thereof on cooling, removing the undissolved precipitate, washing it with water, concentrating the wash water, cooling the hot alkali solution of aluminate with stirring until the alumina is precipitated, separating and washing said precipitated alumina, concentrating said wash water and uniting the caustic mother-liquor from the alumina precipitate, the concentrated wash water from the precipitate undissolved by the hot caustic alkali solution, and the concentrated wash water from the precipitated alumina.

6. The process of claim 5 rendered cyclic by heating the caustic mother-liquor and the concentrated wash waters and applying them to a fresh amount of the precipitate obtained directly from the fresh solution of calcium aluminate.

7. The process of claim 1 as modified by freeing the precipitate, obtained from the solution of calcium aluminate by the acid from water before adding the caustic alkali thereto.

8. The process of claim 1 as modified by mechanically drying the precipitate directly obtained from the calcium aluminate solution and then subjecting it to heat to more completely dry it before submitting it to the action of the hot caustic alkali solution.

9. The method of claim 1 in which the treatment of the first-mentioned precipitate by the caustic alkali solution is performed under a pressure approximately atmospheric and at a temperature approximating the boiling point of said solution.

10. The method recited in claim 1 in which the acid whose calcium salt is insoluble in water is carbonic acid applied in the form of carbon dioxide.

11. The process recited in claim 1 as applied to the solution of calcium aluminate, which comprises dividing said solution into two portions, subjecting one portion to the action of carbon dioxide in amount sufficient to precipitate the alumina and all the calcium as calcium carbonate, mixing said second part of the solution of calcium aluminate with calcium hydroxide in quantities sufficient to precipitate all the alumina as calcium aluminate, separating said precipitates from their respective mother-liquors, uniting, washing, and drying them, and then applying the solution of caustic alkali and succeeding steps as recited in claim 1.

12. The process of claim 1 in which the acid used is carbonic acid in the form of carbon dioxide and the resulting precipitate is subjected to the action of such further amount of carbon dioxide as is necessary to form calcium bicarbonate from at least a portion of the calcium carbonate, this resulting solution is separated from the precipitate and heated whereby the calcium bicarbonate becomes calcium carbonate, thus setting the carbon dioxide free and returning the carbon dioxide to the process.

JEAN CHARLES SÉAILLES.